United States Patent
Shirley, Jr. et al.

(10) Patent No.: US 10,318,382 B2
(45) Date of Patent: Jun. 11, 2019

(54) DETERMINING MISSING ENCODED DATA SLICES

(71) Applicant: International Business Machines Corporation, Armonk, NY (US)

(72) Inventors: Thomas F. Shirley, Jr., Wauwatosa, WI (US); Gary W. Grube, Barrington Hills, IL (US); Bart R. Cilfone, Marina del Ray, CA (US); Ravi V. Khadiwala, Bartlett, IL (US); Greg R. Dhuse, Chicago, IL (US); Thomas D. Cocagne, Elk Grove Village, IL (US); Michael C. Storm, Palo Alto, CA (US); Yogesh R. Vedpathak, Chicago, IL (US); Wesley B. Leggette, Chicago, IL (US); Jason K. Resch, Chicago, IL (US); Andrew D. Baptist, Mt. Pleasant, WI (US); Ilya Volvovski, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/150,841

(22) Filed: Oct. 3, 2018

(65) Prior Publication Data

US 2019/0034278 A1 Jan. 31, 2019

Related U.S. Application Data

(63) Continuation-in-part of application No. 15/705,782, filed on Sep. 15, 2017, which is a continuation of
(Continued)

(51) Int. Cl.
*G06F 12/00* (2006.01)
*G06F 11/10* (2006.01)
(Continued)

(52) U.S. Cl.
CPC ............ *G06F 11/1092* (2013.01); *G06F 3/06* (2013.01); *G06F 21/6218* (2013.01);
(Continued)

(58) Field of Classification Search
CPC .............................. G06F 11/1092; G06F 3/06
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Jae U Yu
(74) *Attorney, Agent, or Firm* — Garlick & Markison; Timothy W. Markison; Patricia A. Markison

(57) ABSTRACT

A method includes determining, by a computing device of a dispersed storage network (DSN), a source name for a data object to be scanned for missing encoded data slices. The method further includes issuing list source requests to the set of storage units. When a list source response is not received from a storage unit of the set of storage units within a response timeframe, the method further includes identifying one or more encoded data slices stored on the storage unit as potentially missing encoded data slices; determining a next level missing encoded data slice determination approach for the storage unit based on one or more of: a number of potentially missing encoded data slices, a performance goal, a network loading level, a rebuilding loading level, a pre-determination, and an entry of a system registry; and executing the next level missing encoded data slice determination approach.

18 Claims, 11 Drawing Sheets

Related U.S. Application Data application No. 14/570,366, filed on Dec. 15, 2014, now Pat. No. 9,778,987.

(60) Provisional application No. 61/934,036, filed on Jan. 31, 2014.

(51) Int. Cl.
*G06F 3/06* (2006.01)
*G06F 21/62* (2013.01)
*H04L 29/08* (2006.01)
*H04L 29/06* (2006.01)

(52) U.S. Cl.
CPC .. *H04L 67/1097* (2013.01); *G06F 2211/1028* (2013.01); *H04L 63/20* (2013.01)

(58) Field of Classification Search
USPC .......................................................... 711/148
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,802,551 A * | 9/1998 | Komatsu | G11C 29/76 711/103 |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,233,244 B1 * | 5/2001 | Runaldue | G06F 5/06 370/412 |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0097293 A1 * | 5/2005 | Hayashi | G11B 20/10 711/169 |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0174156 A1 | 8/2006 | Balasubramanian | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

* cited by examiner

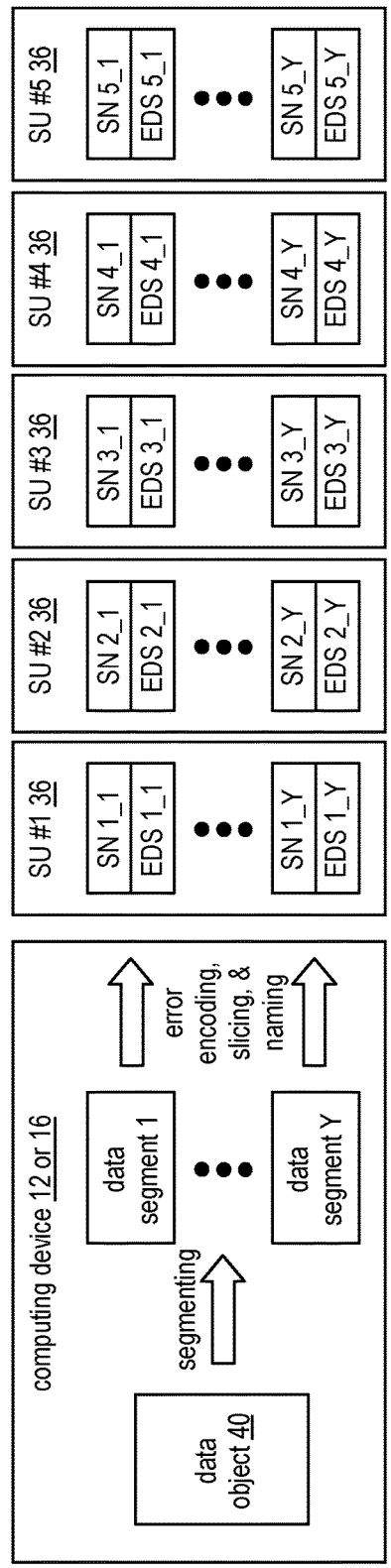
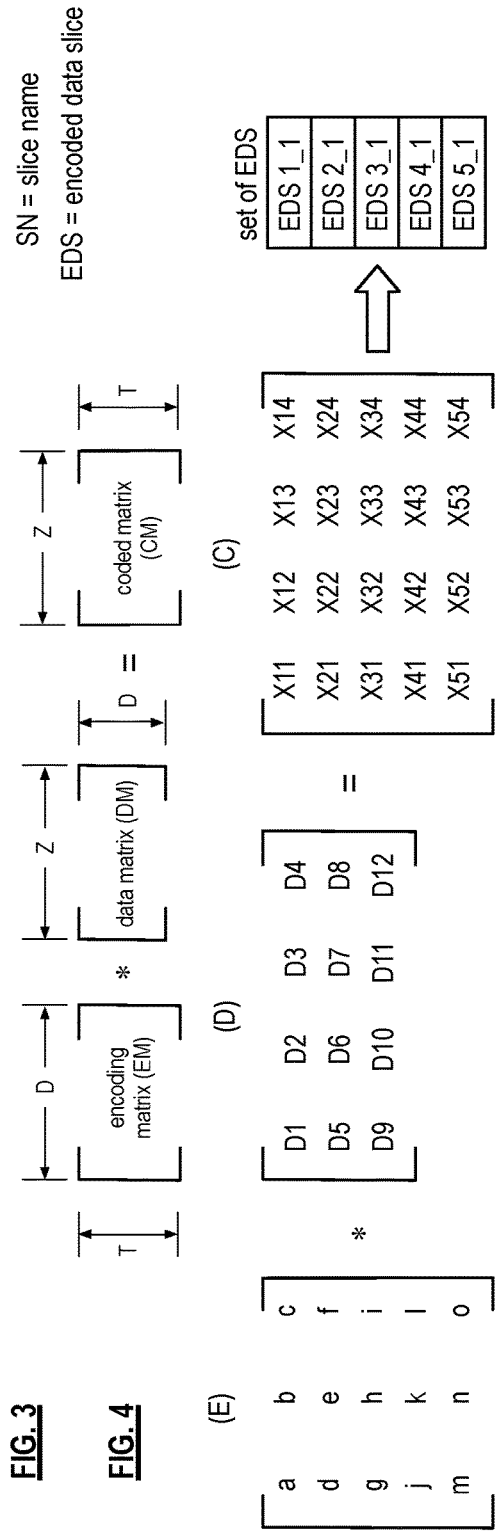

DETERMINING MISSING ENCODED DATA SLICES

CROSS-REFERENCE TO RELATED APPLICATIONS

This application claims priority pursuant to 35 U.S.C. § 120 as a continuation-in-part of U.S. Utility application Ser. No. 15/705,782, entitled "WRITING ENCODED DATA SLICES IN A DISPERSED STORAGE NETWORK," filed Sep. 15, 2017, which claims priority pursuant to claims priority pursuant to 35 U.S.C. § 120 as a continuation of U.S. Utility application Ser. No. 14/570,366, entitled "WRITING ENCODED DATA SLICES IN A DISPERSED STORAGE NETWORK," filed Dec. 15, 2014, issued as U.S. Pat. No. 9,778,987 on Oct. 3, 2017, which claims priority pursuant to 35 U.S.C. § 119(e) to U.S. Provisional Application No. 61/934,036, entitled "UTILIZING STORAGE SLOTS IN A DISPERSED STORAGE NETWORK," filed Jan. 31, 2014, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

It is further known that data can be lost permanently or temporarily due to unavailable storage devices.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
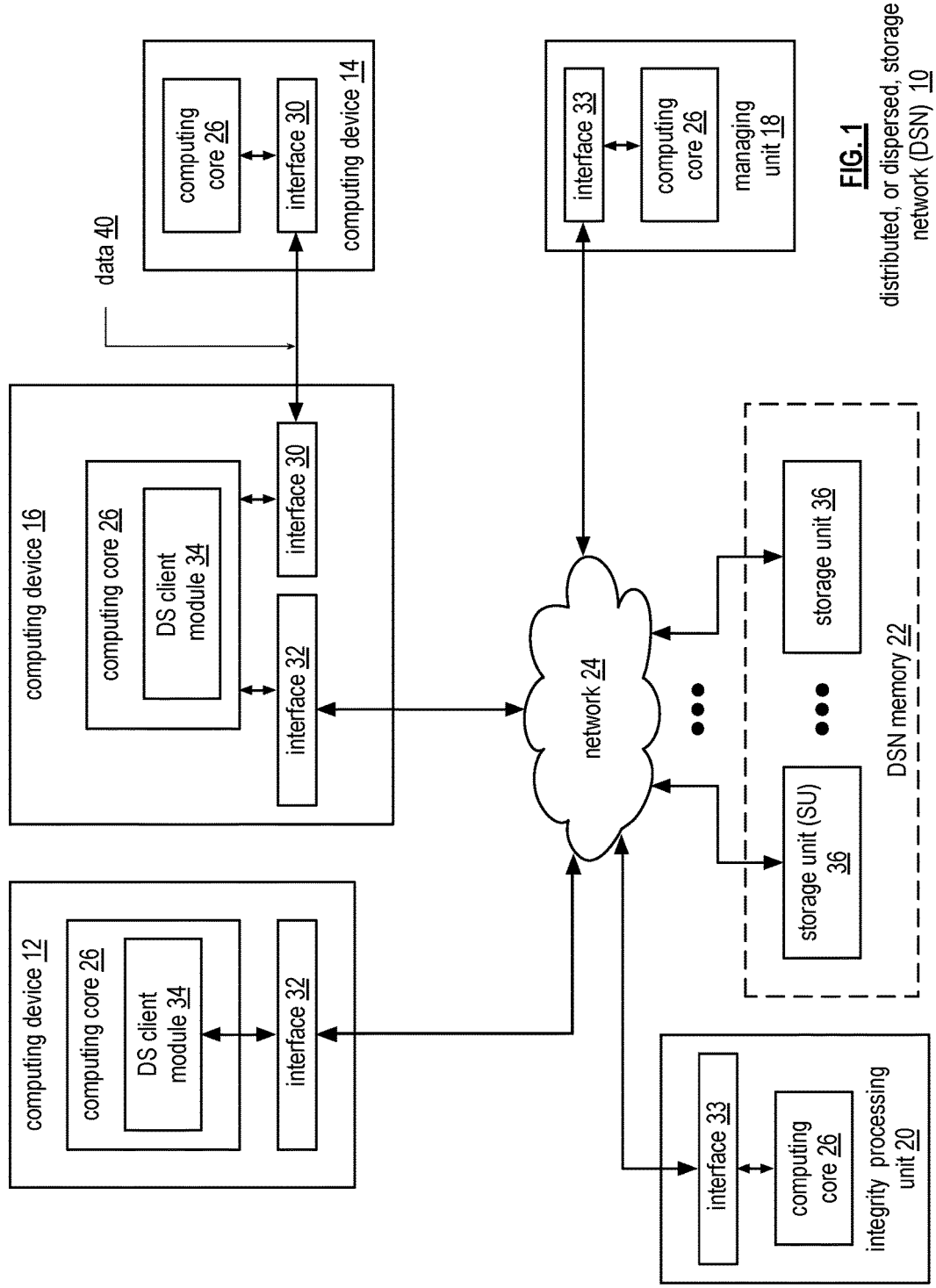
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
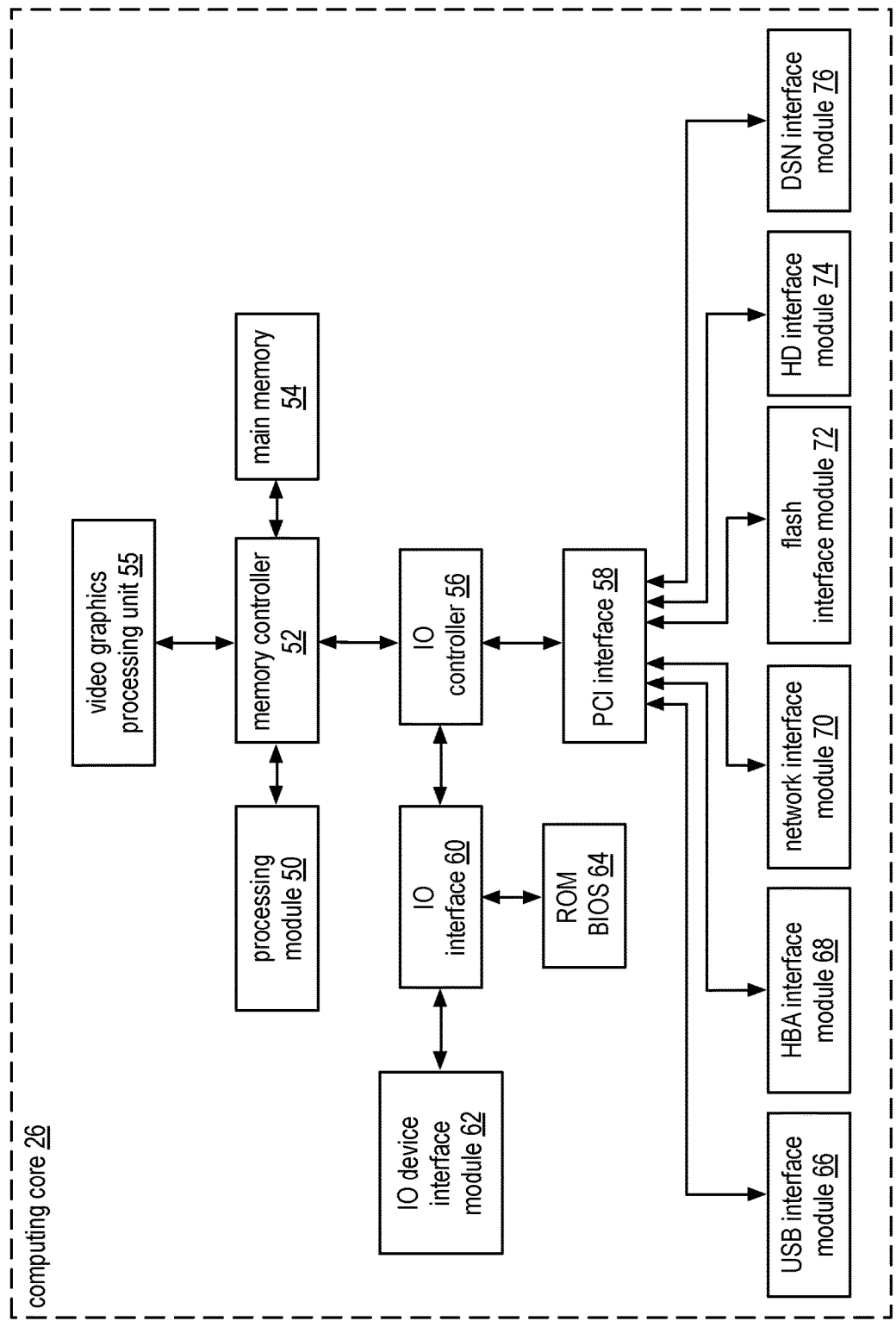
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an 10 interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
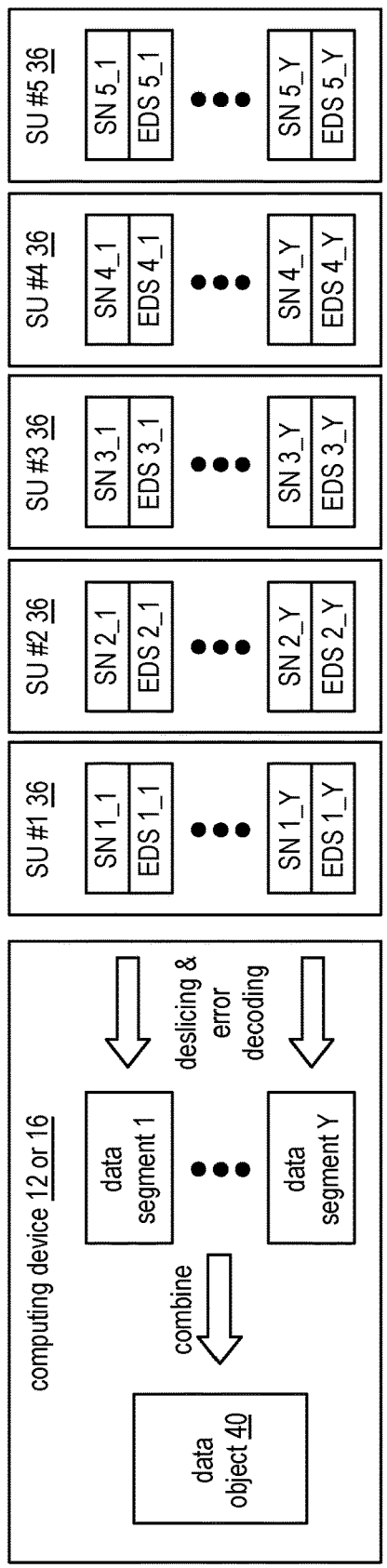
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIGS. 9A-9D are schematic block diagrams of an embodiment of a dispersed storage network (DSN) illustrating an example of storing data, where the DSN includes computing device 12 or 16, storage unit set 82, and network 24. Computing device 12 or 16 includes a dispersed storage (DS) client module 34, which enables the computing device to dispersed storage error encode and decode data. Storage unit set 82 includes a set of storage units 36, where one or more storage units are deployed at one or more sites. Each storage unit provides at least one storage slot of N storage slots. A storage slot includes at least one of a virtual storage location associated with physical memory of the storage. For example, the storage unit set 82 includes storage units 1-14 when 30 storage slots are provided and a varying number of storage slots are associated with each storage unit. Storage units 1-4 are deployed at site 1, storage units 5-8 are deployed at site 2, and storage units 9-14 are deployed at site 3.

The DSN functions to store data to the storage unit set 82 and to retrieve the stored data from the storage unit set 82. FIG. 9 illustrates initial steps of an example of operation of the storing of the data to the storage unit set 82, where the computing device 12 or 16 receives a write data object request 84 from a requesting entity. The write data object request 84 includes one or more of a data object for storage in the DSN, a data identifier (ID) of the data object, an ID of the requesting entity, and a desired performance level indicator. Having received the write data object request 84, the computing device 12 or 16 obtains dispersal parameters. The dispersal parameters includes one or more of a number of storage slots N, an information dispersal algorithm (IDA) width number, a write threshold number, a read threshold number, and a decode threshold number, where a decode threshold number is a minimum number of required encoded data slices of the set of encoded data slices to recover a data segment and where the data segment is dispersed storage error encoded to produce a set of encoded data slices that includes an IDA width number of encoded data slices. The obtaining includes at least one of retrieving a portion of system registry information, utilizing a predetermination, determining based on the desired performance level indicator, and accessing a list based on the requesting entity ID.

Having obtained the dispersal parameters, computing device 12 or 16 selects a set of primary storage slots of N storage slots associated with the storage unit set, where the set of storage slots includes at least a decode threshold number of storage slots and at most an IDA width number of storage slots. The selecting may be based on one or more of storage unit availability information, site availability information, system topology information, a system loading level, a system loading goal level, a data storage availability goal, a data retrieval reliability goal, and a site selection scheme. As a specific example, computing device 12 or 16 selects the IDA width number of storage slots out of the N storage slots. As such, the computing device 12 or 16 selects one permutation out of a number of permutations expressed by a formula: number of permutations of the selecting of the IDA width number of storage slots=N choose IDA width. For instance, the number of permutations of selecting the IDA width number of storage slots=30 choose 15=155 million permutations, when N=30 and the IDA width=15.

Storage of data within the storage unit set can tolerate a number of storage slot failures and/or unavailability without affecting data storage availability and data retrieval reliability in accordance with a formula: number of storage slot failures tolerated=N−IDA width=30−15=15. As such, the storage of data within the storage unit set 82 can tolerate 15 storage slot failures.

The computing device 12 or 16 may select the IDA width number of storage slots in accordance with the site selection scheme to improve the data retrieval reliability. For example, the computing device 12 or 16 selects storage slots at each site of the one or more sites such that at least a decode threshold number of encoded data slices are available from available storage slots at a minimum desired number of sites. As a specific example, computing device 12 or 16 selects storage slots associated with available and better-than-average performing storage units such that the decode threshold number of encoded data slices are available from any two operational sites when one of three total sites is unavailable. For instance, computing device 12 or 16 selects 5 storage slots at each of the 3 sites when the IDA width is 15 and the decode threshold is 10 in accordance with an even distribution selection scheme.

Having selected the set of primary storage slots, computing device 12 or 16 encodes the data object using a dispersed storage error encoding function and in accordance with the dispersal parameters to produce a plurality of sets of encoded data slices. For example, the computing device 12 or 16 encodes a first data segment of a plurality of data segments of the data object to produce a first set of encoded data slices, where the first set of encoded data slices includes the IDA width number of slices and the first data segment may be recovered when at least any decode threshold number of encoded data slices of the set of encoded data slices is retrievable.

Having encoded the data object, computing device 12 or 16 identifies an encoded data slice of a set of encoded data slices for a redundant write operation to produce an identified encoded data slice. The identifying may be based on one or more of a performance level of an associated storage unit, a storage unit performance goal level, a network loading level, a network loading level goal. For example, computing device 12 or 16 selects encoded data slice 15 for replication when encoded data slice 15 is associated with a 15th storage slot of the set of primary storage slots and the fifteenth storage slot is associated with storage unit 13, where storage unit 13 (e.g., storage slot 29 of 30) is associated with a storage unit performance level that is less than the storage unit performance goal level.

Having identified the at least one encoded data slice for replication, computing device 12 or 16, for each identified encoded data slice replication, determines a number of redundant slices to produce based on one or more of a desired performance level, a lookup, and a predetermination. For example, computing device 12 or 16 determines to produce three redundant slices for encoded data slice 15 when the desired performance level indicates to produce three redundant slices.

Having determined the number of redundant slices to produce, computing device 12 or 16 replicates the identified encoded data slice to produce the number of redundant slices. For instance, the computing device 12 or 16 replicates encoded data slice 15 to produce three redundant encoded data slices 15.

Having produced the redundant slices (e.g., replicated encoded data slices), for each redundant slice, computing device 12 or 16 selects at least one alternate storage slot. The selecting may be based on one or more of a slice to storage slot mapping, performance levels of the storage units, a storage unit performance threshold level, a performance goal, a network loading level, and a network loading level goal. For example, the computing device 12 or 16 selects storage slots 9, 17, and 30 for storage of the redundant slices when storage slots 9, 17, and 30 are not included in the set of primary storage slots and performance levels of the associated storage units (e.g., storage units 4, 7, and 14) are each greater than the storage unit performance threshold level.

Figure 9A:
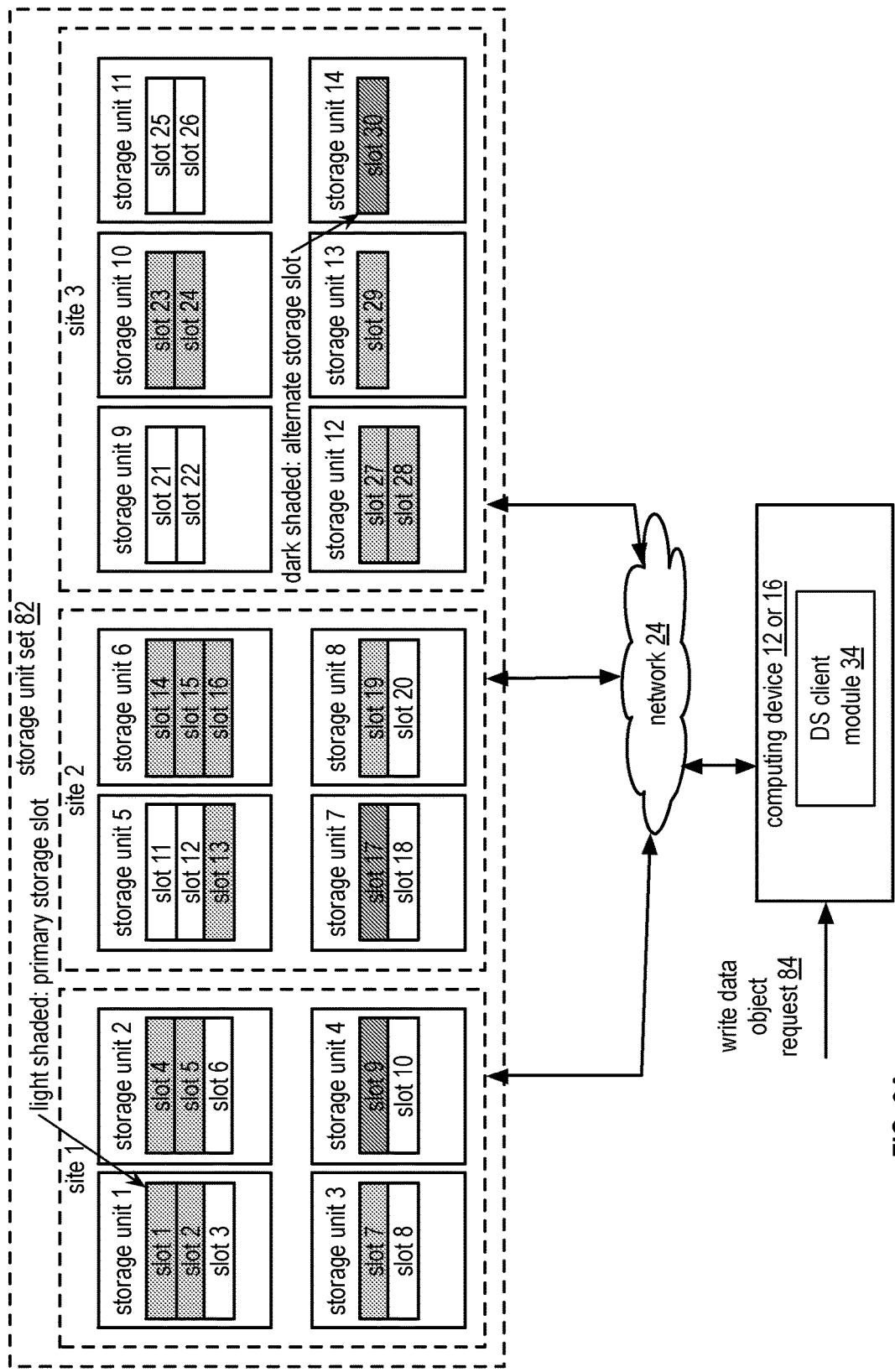
FIGS. 9A-9D are schematic block diagrams of an embodiment of a dispersed storage network (DSN) illustrating an example of storing data in accordance with the present invention.
Figure 9B:
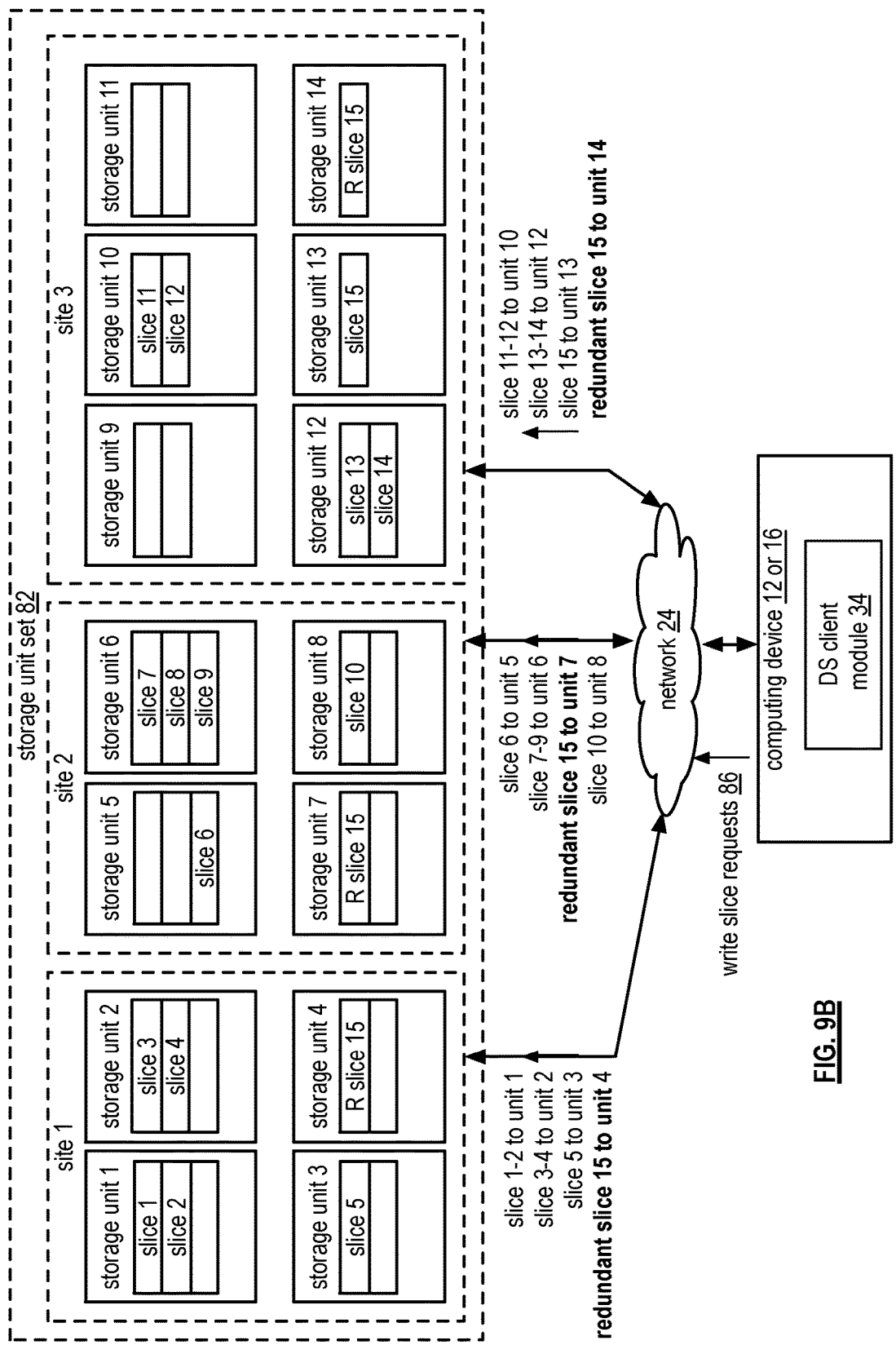

FIG. 9B illustrates further steps of the example of operation of the storing of the data to the storage unit set 82, where the computing device 12 or 16 generates a set of first write slice requests 86 regarding the set of encoded data slices less the identified encoded data slice. As a specific example, computing device 12 or 16 generates one or more sets of write slice requests 86, where the one or more sets of write slice requests 86 includes the set of encoded data slices less encoded data slice 15.

Having generated the set of first write slice requests 86, computing device 12 or 16 sends, via the network 24, the set of first write slice requests 86 to storage units of the storage unit set 82 that correspond to the selected set of primary storage slots. For instance, computing device 12 or 16 sends write slice requests to store encoded data slices 1-2 in storage slots 1-2 of storage unit 1, encoded data slices 3-4 in storage slots 4-5 of storage unit 2, encoded data slice 5 in storage slot 7 of storage unit 3, encoded data slice 6 in storage slot 13 of storage unit 5, encoded data slices 7-9 in storage slots 14-16 of storage unit 6, encoded data slice 10 in storage slot 19 of storage unit 8, encoded data slices 11-12 in storage slots 23-24 of storage unit 10, and encoded data slices 13-14 in storage slots 27-28 of storage unit 12.

Having sent the set of first write requests, computing device 12 or 16 generates a set of second write slice requests 86 regarding the identified encoded data slice. As a specific example, the set of second write slice requests 86 includes the identified encoded data slice and the one or more redundant encoded data slices of the identified encoded data slice. For instance, the set of second write slice requests 86 includes encoded data slice 15, and the three copies of redundant encoded data slice 15.

Having generated the set of second write requests 86, computing device 12 or 16 sends, via the network 24, the set of second write requests to a set of storage units of the DSN, wherein each storage unit of the set of storage units is sent a corresponding one of the set of second write requests. For instance, computing device 12 or 16 sends write slice requests to storage unit 4 to store a first redundant encoded data slice 15 in storage slot 9, sends another write slice request to storage unit 7 to store a second redundant encoded data slice 15 in storage slot 17, sends yet another write slice request to storage unit 14 to store a third redundant encoded data slice 15 in storage slot 30 and sends a further write slice request to storage unit 13 to store encoded data slice 15 (e.g., the identified encoded data slice) in storage slot 29 of storage unit 13.

Alternatively, or in addition to, computing device 12 or 16 may identify a second encoded data slice of the set of encoded data slices for the redundant write operation to produce a second identified encoded data slice. When producing the second encoded data slice, computing device 12 or 16 generates the set of first write requests regarding the set of encoded data slices less the identified encoded data slice and the second identified encoded data slice. Having generated the set of first write requests, computing device 12 or 16 generates a set of third write requests regarding the second identified encoded data slice. For instance, the set of third write requests includes the second identified encoded data slice and one or more replicates of the second identified encoded data slice. Having generated the set of third write requests, computing device 12 or 16 sends, via the network 24, the set of third write requests to a second set of storage units of the DSN, where each storage unit of the second set of storage units is sent a corresponding one of the set of third write requests.

Figure 9C:
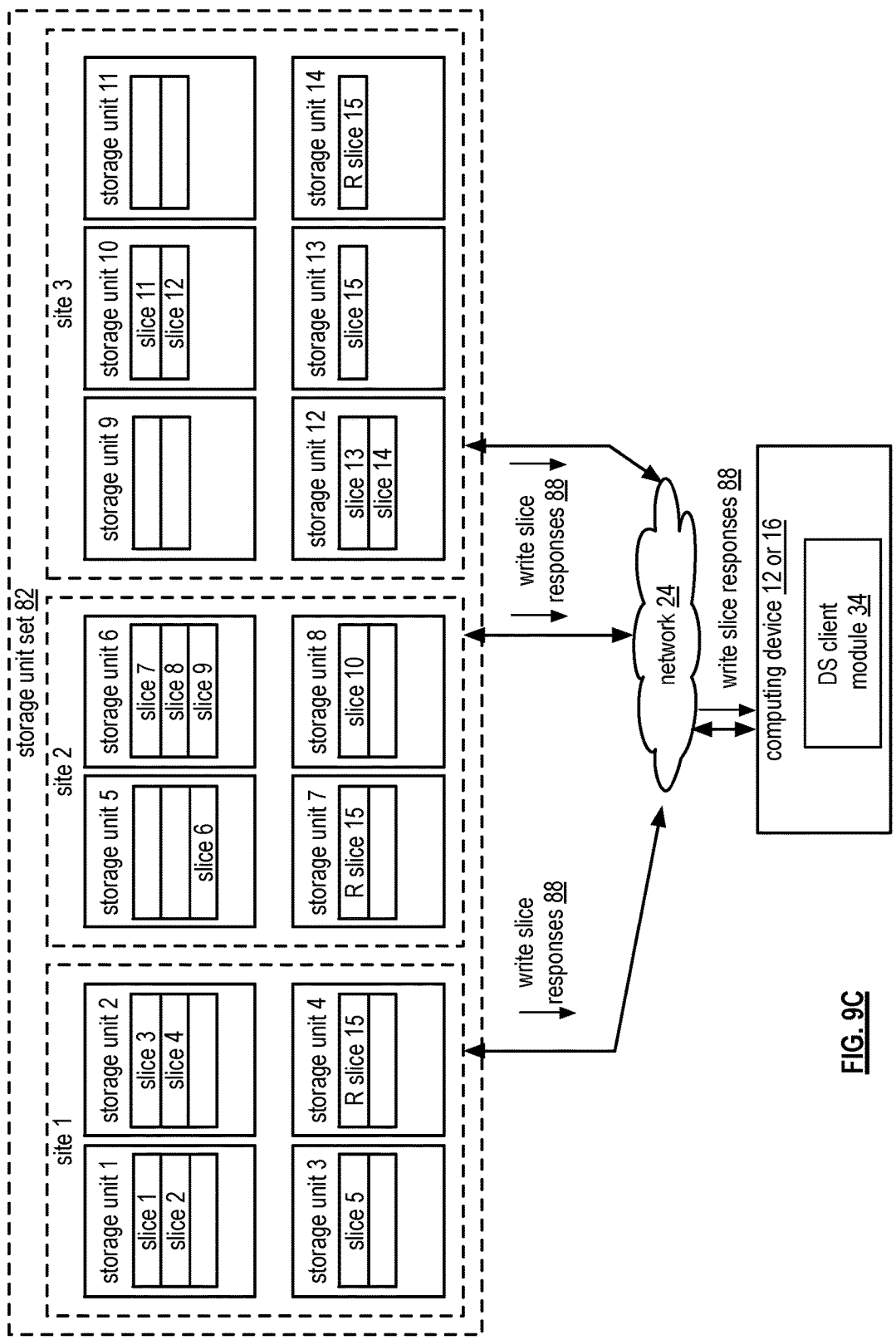
Figure 9D:
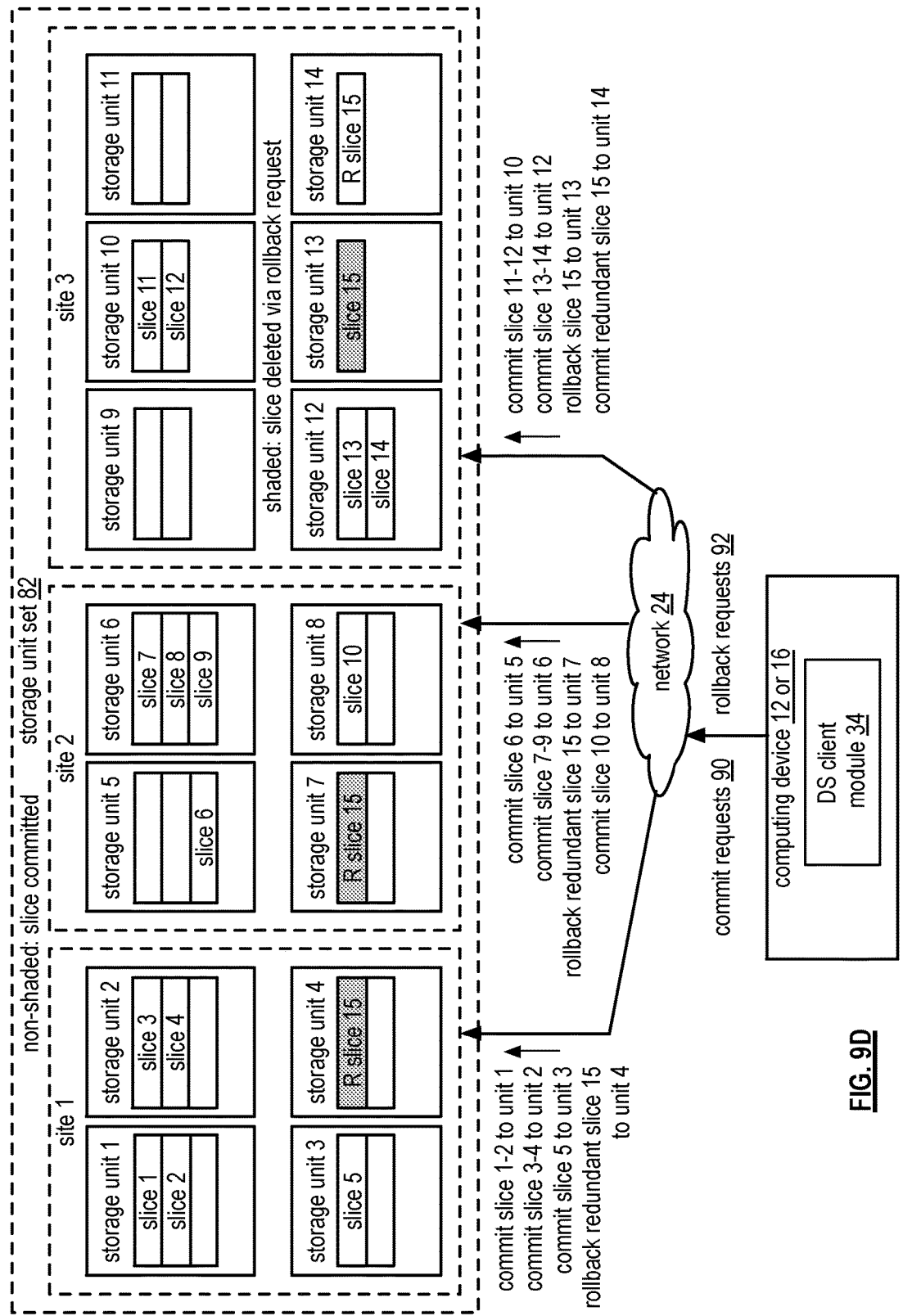

FIG. 9C illustrates further steps of the example of operation of the storing of the data to the storage unit set 82, where computing device 12 or 16 receives, via the network 24, write responses 86 from at least some storage units of a combined set of storage units that includes the storage units and the set of storage units. Each write slice response includes a write operation status indicator. The write operation status indicator includes a favorable indication when a corresponding write slice request was successfully executed. The write operation status indicator includes an unfavorable indication when the corresponding write slice request was not successfully executed (e.g., due to an error).

The receiving of the write slice responses 88 may be associated with varying timing such that individual write slice responses 88 from different storage units are received within different time frames by computing device 12 or 16. For instance, a favorable write slice response 88 may be received from storage unit 4 regarding redundant encoded data slice 15 before receiving another favorable write slice response 88 from storage unit 7 regarding another redundant encoded data slice 15.

FIG. 8D illustrates further steps of the example of operation of the storing of the data to the storage unit set 82, where the computing device 12 or 16, having received the write responses from the at least some storage units of the combined set of storage units that includes the storage units and the set of storage units, issues one or more commands based on the received write responses. As a specific example, computing device 12 or 16 receives a write response 88 from a storage unit of the set of storage units (e.g., a storage unit associated with storage of the identified encoded data slice and the redundant encoded data slices) and sends, via the network 24, a delete write request (e.g., a rollback request 92) to remaining storage units of the set of storage units. For instance, computing device 12 or 16 receives the write response 88 from storage unit 14 with regards to redundant encoded data slice 15 and sends, via the network 24, rollback requests 92 to storage units 4, 7, and 13 to facilitate deletion of redundant encoded data slices 15 and the identified encoded data slice 15.

As another specific group of examples, the computing device 12 or 16 receives, via the network 24, the write responses from the at least some storage units of the combined set of storage units that includes the storage units and the set of storage units and issues the one or more commands based on the received write responses. As a first specific example of the group of examples, the issuing of the one or more commands includes, when a threshold number of write responses (e.g., favorable write threshold number for unique slices) have been received, the computing device 12 or 16 sends, via the network 24, a write commit command (e.g., commit request 90) to each storage unit of the at least some storage units of the combined set of storage units (e.g., send to storage units storing unique slices). For instance, computing device 12 or 16 generates and sends, via the network 24, commit requests 90 to commit storage of encoded data slices 1-2 in storage slots 1-2 of storage unit 1, encoded data slices 3-4 in storage slots 4-5 of storage unit 2, encoded data slice 5 in storage slot 7 of storage unit 3, encoded data slice 6 in storage slot 13 of storage unit 5, encoded data slices 7-9 in storage slots 14-16 of storage unit 6, encoded data slice 10 in storage slot 19 of storage unit 8, encoded data slices 11-12 in storage slots 23-24 of storage unit 10, encoded data slices 13-14 in storage slots 27-28 of storage unit 12, and redundant encoded data slices 15 in storage slots 30 of storage unit 14.

As a second specific example of the group of examples, the issuing of the one or more commands includes computing device 12 or 16 determining whether the at least some storage units of the combined set of storage units include a storage unit of the set of storage units. When the at least some storage units of the combined set of storage units includes the storage unit of the set of storage units, the computing device 12 or 16 sends, via the network 24, a write commit command 90 to the storage unit of the set of storage units and sends, via the network 24, a rollback command 92 to each remaining storage unit of the set of storage units (e.g., to just keep one slice).

As a third specific example of the group of examples, the issuing of the one or more commands includes computing device 12 or 16 determining whether the at least some storage units of the combined set of storage units include the storage unit of the set of storage units. When the at least some storage units of the combined set of storage units does not include the storage unit of the set of storage units, computing device 12 or 16 sends, via the network 24, the rollback command 92 to each storage unit of the set of storage units (e.g., to delete replicate slices and the identified encoded data slice since not needed).

As a fourth specific example of the group of examples, the issuing of the one or more commands includes the computing device 12 or 16 receiving, via the network 24, commit responses from the at least some storage units of the combined set of storage units that includes the storage units and the set of storage units. When a commit threshold number of commit responses have been received, the computing device 12 or 16 sends, via the network 24, a write finalize command to each storage unit of the at least some storage units of the combined set of storage units (e.g., send to units storing unique slices).

As a fifth specific example of the group of examples, the issuing of the one or more commands includes the computing device 12 or 16 determining whether the at least some storage units of the combined set of storage units that provided the commit responses include the storage unit of the set of storage units. When the at least some storage units of the combined set of storage units that provided the commit responses includes the storage unit of the set of storage units, the computing device 12 or 16 sends, via the network 24, a write finalize command to the storage unit of the set of storage units and sends, via the network 24, an undo command to each remaining storage unit of the set of storage units (e.g., to just keep one slice).

As a sixth specific example of the group of examples, the issuing of the one or more commands includes computing device 12 or 16 determining whether the at least some storage units of the combined set of storage units that provided the commit responses include the storage unit of the set of storage units. When the at least some storage units of the combined set of storage units that provided the commit responses units does not include the storage unit of the set of storage units, computing device 12 or 16 sends, via the network 24, an undo command to the set of storage units (e.g., to delete replicate slices and the identified encoded data slice since not needed).

Figure 10:
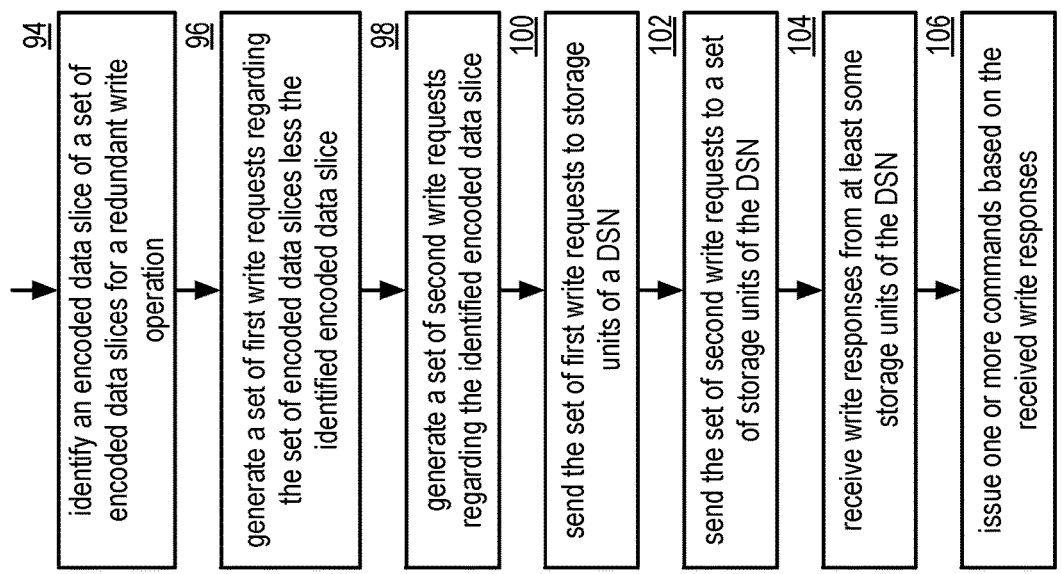
FIG. 10 is a flowchart illustrating an example of storing data in accordance with the present invention.

FIG. 10 is a flowchart illustrating an example of storing data. The method begins at step 94 where a processing module of a computing device of one or more computing devices of a dispersed storage network (DSN) identifies an encoded data slice of a set of encoded data slices for a redundant write operation to produce an identified encoded data slice. For example, the processing module identifies an encoded data slice slated for storage to a storage unit associated with an unfavorable storage reliability level.

The method continues at step 96 where the processing module generates a set of first write requests regarding the set of encoded data slices less the identified encoded data slice. The method continues at step 98 where the processing module generates a set of second write requests regarding the identified encoded data slice (e.g., includes the identified encoded data slice and one or more replicates of the identified encoded data slice).

The method continues at step 100 where the processing module sends the set of first write requests to storage units of the DSN. The method continues at step 102 where the processing module sends the set of second write requests to a set of storage units of the DSN, where each storage unit of the set of storage units is sent a corresponding one of the set of second write requests. Alternatively, or in addition to, the processing module may identify a second encoded data slice of the set of encoded data slices for the redundant write operation to produce a second identified encoded data slice. When identifying the second encoded data slice, the processing module generates the set of first write requests regarding the set of encoded data slices less the identified encoded data slice and the second identified encoded data slice. Having generated the set of first write requests, the processing module generates a set of third write requests regarding the second identified encoded data slice (e.g., includes the second identified encoded data slice and one or more replicates of the second identified encoded data slice). Having generated the set of third write requests, the processing module sends the set of third write requests to a second set of storage units of the DSN, where each storage unit of the second set of storage units is sent a corresponding one of the set of third write requests.

The method continues at step 104 where the processing module receives write responses from at least some storage units of a combined set of storage units that includes the storage units and the set of storage units. The method continues at step 106 where the processing module issues one or more commands based on the received write responses. As a specific example, the processing module receives a write response from a storage unit of the set of storage units and sends a delete write request (e.g., a rollback request) to remaining storage units of the set of storage units.

As another specific group of examples, the processing module receives the write responses from the at least some storage units of the combined set of storage units that includes the storage units and the set of storage units and issues the one or more commands based on the received write responses. As a first specific example of the group of examples, the issuing of the one or more commands includes, when a threshold number of write responses (e.g., favorable write threshold number for unique slices) have been received, the processing module sends a write commit command to each storage unit of the at least some storage units of the combined set of storage units (e.g., send to storage units storing unique slices).

As a second specific example of the group of examples, the issuing of the one or more commands includes the processing module determining whether the at least some storage units of the combined set of storage units include a storage unit of the set of storage units. When the at least some storage units of the combined set of storage units includes the storage unit of the set of storage units, the processing module sends a write commit command to the storage unit of the set of storage units and sends a rollback command to each remaining storage unit of the set of storage units (e.g., to just keep one slice).

As a third specific example of the group of examples, the issuing of the one or more commands includes the processing module determining whether the at least some storage units of the combined set of storage units include the storage unit of the set of storage units. When the at least some storage units of the combined set of storage units does not include the storage unit of the set of storage units, the processing module sends the rollback command to each storage unit of the set of storage units (e.g., to delete replicate slices and the identified encoded data slice since not needed).

As a fourth specific example of the group of examples, the issuing of the one or more commands includes the processing module receiving commit responses from the at least some storage units of the combined set of storage units that includes the storage units and the set of storage units. When a commit threshold number of commit responses have been received, the processing module sends a write finalize command to each storage unit of the at least some storage units of the combined set of storage units (e.g., send to units storing unique slices).

As a fifth specific example of the group of examples, the issuing of the one or more commands includes the processing module determining whether the at least some storage units of the combined set of storage units that provided the commit responses include the storage unit of the set of storage units. When the at least some storage units of the combined set of storage units that provided the commit responses includes the storage unit of the set of storage units, the processing module sends a write finalize command to the storage unit of the set of storage units and sends an undo command to each remaining storage unit of the set of storage units (e.g., to just keep one slice).

As a sixth specific example of the group of examples, the issuing of the one or more commands includes the processing module determining whether the at least some storage units of the combined set of storage units that provided the commit responses include the storage unit of the set of storage units. When the at least some storage units of the combined set of storage units that provided the commit responses units does not include the storage unit of the set of storage units, the processing module sends an undo command to the set of storage units (e.g., to delete replicate slices and the identified encoded data slice since not needed).

The method described above in conjunction with the processing module can alternatively be performed by other modules of the dispersed storage network or by other devices. In addition, at least one memory section that stores operational instructions can, when executed by one or more processing modules of one or more computing devices of the dispersed storage network (DSN), cause the one or more computing devices to perform any or all of the method steps described above.

Figure 11:
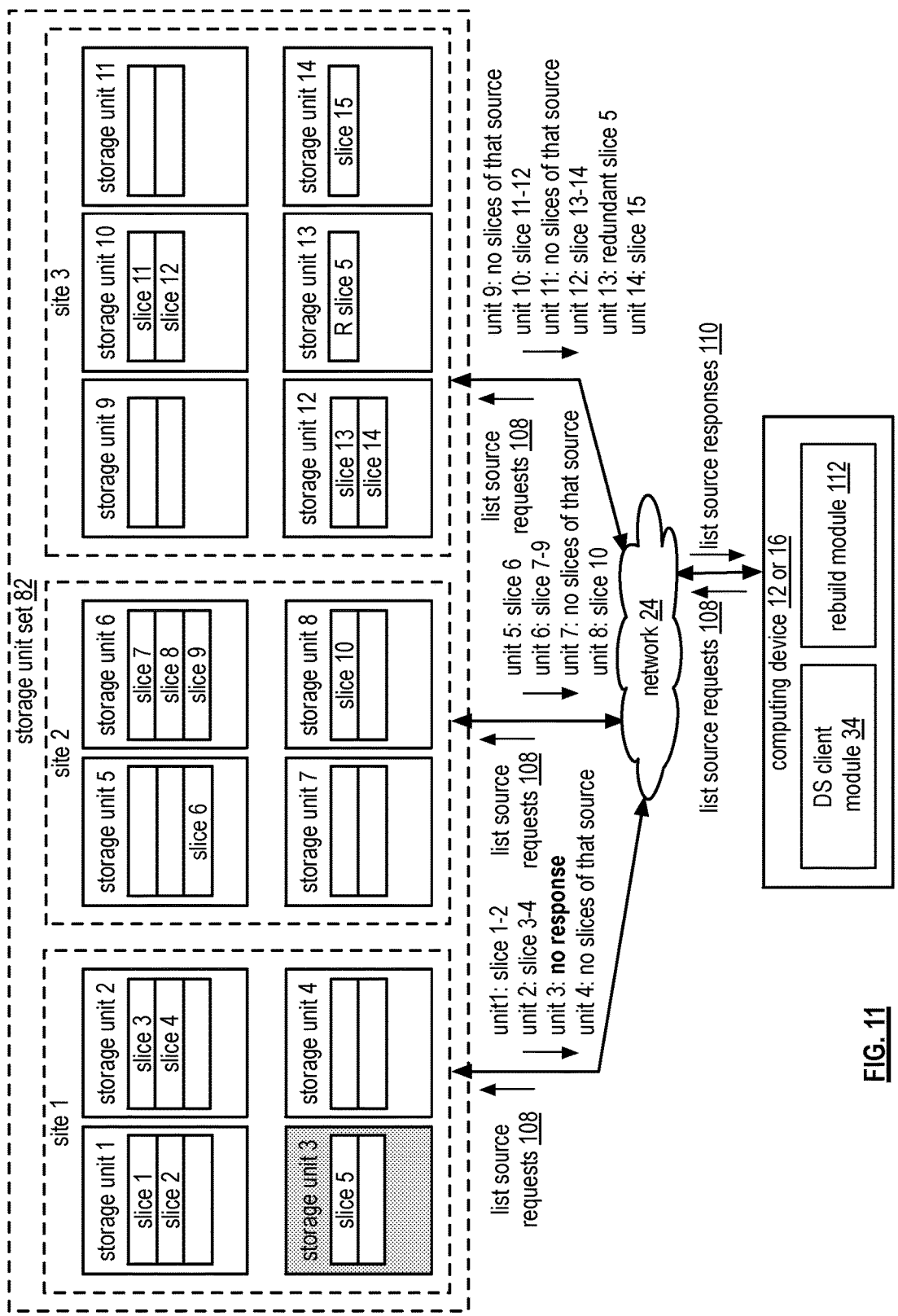
FIG. 11 is a schematic block diagram of another embodiment of a dispersed storage network (DSN) in accordance with the present invention.

FIG. 11 is a schematic block diagram of another embodiment of a dispersed storage network (DSN) that includes computing device 12 or 16, storage unit set 82, and network 24. Computing device 12 or 16 includes a dispersed storage (DS) client module 34, which enables the computing device to dispersed storage error encode and decode data. Computing device 12 or 16 further includes a rebuild module 112 (e.g., DS integrity processing unit 20) capable of detecting and rebuilding missing encoded data slices. Storage unit set 82 includes a set of storage units 36, where one or more storage units are deployed at one or more sites. Each storage unit provides at least one storage slot of N storage slots. A storage slot includes at least one of a virtual storage location associated with physical memory of the storage. For example, the storage unit set 82 includes storage units 1-14 where 30 storage slots are provided and a varying number of storage slots are associated with each storage unit. Storage units 1-4 are deployed at site 1, storage units 5-8 are deployed at site 2, and storage units 9-14 are deployed at site 3.

A data object is stored as a plurality of sets of encoded data slices on the set of storage units 82 of the DSN where the data object is dispersed storage error encoded based on dispersal parameters to produce a plurality of sets of encoded data slices. The dispersal parameters includes one or more of a number of storage slots N, an information dispersal algorithm (IDA) width number, a write threshold number, a read threshold number, and a decode threshold number.

The DSN functions to store the data object as sets of encoded data slices to the storage unit set 82, to recover the data object from the storage unit set 82 by retrieving at least some of the encoded data slices of each set of encoded data slices, and to determine missing encoded data slices. In an example of operation of determining the missing encoded data slices, computing device 12 or 16 determines a source name for a stored data object to be scanned for missing encoded data slices. The determining may be based on one or more of identifying the source name from a list of source names to be scanned, a list of data objects to be scanned, interpreting a schedule, receiving an error message, and performing a directory lookup. For example, computing device 12 or 16 identifies a next source name as the source name on the list of source names to be scanned.

A source name includes a vault identifier (ID) and an object ID. The vault ID may be associated with an affiliation of commonalities, where the commonalities include one or more of user devices of a common group, users of the user devices, a common group of associated data, and any other commonality. The object ID may be generated as a unique value associated with storage of a particular data object. The generating includes at least one of generating a random number as the unique value and performing a deterministic function on an aspect of storing data to produce the unique value. The deterministic function includes at least one of a hashing function, a mask generating function, a sponge function, and a hash based message authentication code. The aspect of storing data includes at least one of the data ID, a requesting entity ID, a user device ID, and any other value associated with the storing of the data.

Having determined the source name, computing device 12 or 16 issues list source requests 108 to the storage units of the storage unit set 82. A list source request of the list source requests 108 includes a request to list slice names of encoded data slices associated with the source name stored by a storage unit of the set of storage units. For example, computing device 12 or 16 generates the list source request 108 and sends, via the network 24, the list source request 108 to each storage unit. Alternatively, computing device 12 or 16 issues, via the network 24, the list source request 108 to storage units associated with storage of the stored data object (e.g., those storage units associated with storage slots that hold one or more encoded data slices of the stored data object).

Having issued the list source requests 108, computing device 12 or 16 receives, via the network 24, list source responses 110 from at least some of the storage units. A list source response 110 includes a list of one or more slice names of stored encoded data slices associated with a storage unit. The slice name includes one or more of the source name, a pillar index (e.g., a slice number of a set of slices), and a segment number of a plurality of segments associated with the data object. For example, storage unit 1 issues a list source response 110 indicating that storage unit 1 is storing encoded data slices 1-2. As another example, storage unit 4 issues a list source response 110 indicating that storage unit 4 is not storing any encoded data slices associated with the source name. Missing encoded data slices from the set of encoded data slices can be identified from received list source responses. For example, if storage unit 1 is known to store slice 1 and slice 2 but returns a list source response only indicating slice 1 is stored on storage unit 1, slice 2 is flagged as missing.

Computing device 12 or 16 may not receive a list source response 110 from a storage unit. For example, a storage unit may be unavailable due to one or more scenarios including off-line for maintenance, off-line to update software, off-line due to an issue with at least a portion of the network 24, off-line due to a hardware failure, and off-line due to a software issue. For example, computing device 12 or 16 does not receive a list source response 110 from storage unit 3 when storage unit 3 is unavailable. When a list source response is not received from a storage unit of the set of storage units within a response timeframe, computing device 12 or 16 identifies one or more encoded data slices stored on the storage unit as potentially missing encoded data slices. In an example of identifying the potentially missing slices, computing device 12 or 16 identifies encoded data slice 5 as the potentially missing slice when the list source response 110 from storage unit 3 is not received within a response timeframe.

When a list source response is not received, computing device 12 or 16 determines a next level missing encoded data slice determination approach based on one or more of: a number of potentially missing encoded data slices, a performance goal, a network loading level, a rebuilding loading level, a predetermination, and an entry of a system registry. Computing device 12 or 16 then executes the next level missing encoded data slice determination approach.

When a greater number of encoded data slices of a set of encoded data slices are potentially missing (e.g., a number nearing the decode threshold number of encoded data slices of a set of encoded data slices), the computing device 12 or 16 may determine to rebuild the potentially missing encoded data slices stored on the unavailable storage unit rather than wait or re-query the unavailable storage unit. For example, the next level missing encoded data slice determination approach may include the computing device 12 or 16 flagging the potentially missing encoded data slices as missing encoded data slices when "n−k+x" encoded data slices of a set of encoded data slices of the plurality of sets of encoded data slices are potentially missing, where "n" is the width number, "k" is the decode threshold number, and "x" is an integer between 1 and "n−k−1." The width number is a total number of encoded data slices of a set of encoded data slices and the decode threshold number is a minimum number of encoded data slices of a set of encoded data slices required to recover a data segment of the data object, where the data segment is dispersed storage error encoded to produce the set of encoded data slices. For example, when "n" is 15 and "k" is 10, "n−k−1" is 4, and "x" is between 1 and 4. Therefore, when between 6 and 9 encoded data slices are potentially missing, the computing device 12 or 16 would flag these encoded data slices as missing encoded data slices. Flagging the potentially missing encoded data slices as missing encoded data slices may further include issuing a slice error to at least one of a managing unit, one or more storage units of the set of storage units 82, and a user device.

Computing device 12 or 16 rebuilds encoded data slices flagged as missing or instructs one or more other computing devices of the DSN to rebuild the flagged missing encoded data slices. Alternatively, computing device 12 or 16 may schedule rebuilding encoded data slices flagged as missing for later time. Further, computing device 12 or 16 may initiate storage of one or more foster slices for the flagged missing encoded data slices on an available storage unit of the set of storage units. In this example, only slice 5 is potentially missing (storage unit 3 is unavailable). Therefore, according to this next level missing slice determination approach, slice 5 would not be flagged as missing.

Another next level missing slice determination approach may include waiting a time period for the unavailable storage unit to become available. For example, when "n−k+x" encoded data slices of the set of encoded data slices are not potentially missing, the next level missing slice determination approach includes waiting a time period for the unavailable storage unit to become available and then sending a new list source request to the unavailable storage unit. In this example, storage unit 3 is only storing one encoded data slice, slice 5. According to this next level missing slice determination approach, rebuilding of only one potentially missing encoded data slice is determined to be less crucial and computing device 12 or 16 will wait a time period then re-query storage unit 3 regarding slice 5. The time period is set based on one or more of: performance requirements, rebuild delay, and network bandwidth. This period of time may adapt automatically to tradeoff between unnecessary rebuild activity (rebuilding slices which still exist as foster slices on off-line storage units) and reduced reliability (caused by postponing rebuilds).

Another next level missing slice determination approach may include computing device 12 or 16 determining whether one or more received list source responses indicate storage of the potentially missing encoded data slices on one or more other storage units. When the one or more received list source responses do not indicate storage of the potentially missing encoded data slices on the one or more other storage units, computing device 12 or 16 waits a time period to receive the one or more list source responses indicating storage of the potentially missing encoded data slices on one or more other storage units. The time period is set based on one or more of: performance requirements, rebuild delay, and network bandwidth. When the one or more received list source responses indicate storage of the potentially missing encoded data slices on the one or more other storage units, computing device 12 or 16 identifies the potentially missing encoded data slices as not missing. In this example, computing device 12 or 16 receives a list source response from storage unit 13 indicating it is storing a redundant slice 5. Therefore, slice 5 stored on storage unit 3 is identified as not missing because redundant slice 5 is available.

Figure 12:
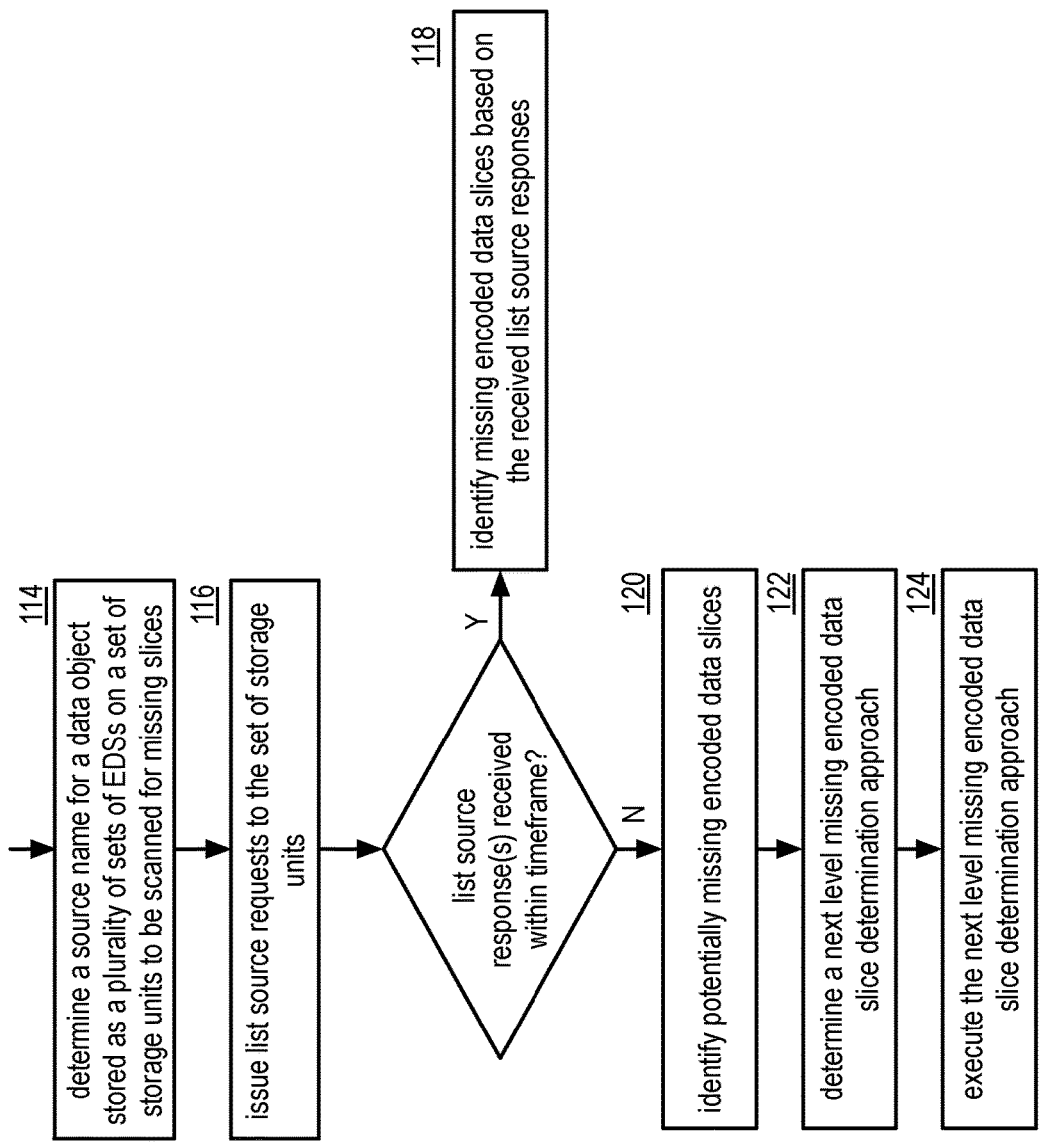
FIG. 12 is a logic diagram of an example of a method of determining missing encoded data slices in accordance with the present invention.

FIG. 12 is a logic diagram of an example of a method of determining missing encoded data slices. The method begins with step 114 where a computing device of a dispersed storage network (DSN) determines a source name for a data object to be scanned for missing encoded data slices (EDSs) where the data object is stored as a plurality of sets of encoded data slices on a set of storage units of the DSN. The determining may be based on one or more of identifying the source name from a list of source names to be scanned, a list of data objects to be scanned, interpreting a schedule, receiving an error message, and performing a directory lookup. For example, the computing device identifies a next source name as the source name on the list of source names to be scanned.

A source name includes a vault identifier (ID) and an object ID. The vault ID may be associated with an affiliation of commonalities, where the commonalities include one or more of user devices of a common group, users of the user devices, a common group of associated data, and any other commonality. The object ID may be generated as a unique value associated with storage of a particular data object. The generating includes at least one of generating a random number as the unique value and performing a deterministic function on an aspect of storing data to produce the unique value. The deterministic function includes at least one of a hashing function, a mask generating function, a sponge function, and a hash based message authentication code. The aspect of storing data includes at least one of the data ID, a requesting entity ID, a user device ID, and any other value associated with the storing of the data.

The method continues with step 116 where the computing device issues list source requests to the storage units of the storage unit set. A list source request of the list source requests includes a request to list slice names of encoded data slices associated with the source name stored by a storage unit of the set of storage units. For example, the computing device generates the list source requests and sends a list source request to each storage unit. Alternatively, the computing device issues the list source requests to storage units associated with storage of the stored data object (e.g., those storage units associated with storage slots that hold one or more encoded data slices of the stored data object).

When one or more list source responses are received from the set of storage units within a response timeframe, the method continues with step 118 where the computing device identifies missing encoded data slices from a set of encoded data slices of the plurality of sets of encoded data slices based on the received list source responses. A list source response includes a list of one or more slice names of stored encoded data slices associated with a storage unit. The slice name includes one or more of the source name, a pillar index (e.g., a slice number of a set of slices), and a segment number of a plurality of segments associated with the data object.

When a list source response is not received from a storage unit of the set of storage units within a response timeframe, the method continues with step 120 where the computing device identifies one or more encoded data slices stored on the storage unit as potentially missing encoded data slices. Computing device may not receive a list source response from an unavailable storage unit. A storage unit may be unavailable due to one or more scenarios including off-line for maintenance, off-line to update software, off-line due to an issue with at least a portion of the network, off-line due to a hardware failure, and off-line due to a software issue.

The method continues with step 122 where the computing device determines a next level missing encoded data slice determination approach based on one or more of: a number of potentially missing encoded data slices, a performance goal, a network loading level, a rebuilding loading level, a predetermination, and an entry of a system registry. The method continues with step 124 where the computing device executes the next level missing encoded data slice determination approach.

When a greater number of encoded data slices of the set of encoded data slices are potentially missing, the computing device may determine to rebuild the potentially missing encoded data slices stored on the unavailable storage unit rather than wait or re-query the unavailable storage unit. For example, the next level missing encoded data slice determination approach may include the computing device flagging the potentially missing encoded data slices as missing encoded data slices when "n−k+x" encoded data slices of a set of encoded data slices are potentially missing, where "n" is the width number, "k" is the decode threshold number, and x "x" is an integer between 1 and "n−k−1". For example, when "n" is 15 and "k" is 10, "n−k−1" is 4, and "x" is between 1 and 4. Therefore, when between 6 and 9 encoded data slices are potentially missing, the computing device flags these encoded data slices as missing encoded data slices. Flagging the potentially missing encoded data slices as missing encoded data slices may further include issuing a slice error to at least one of a managing unit, one or more storage units of the set of storage units, and a user device.

The computing device rebuilds encoded data slices flagged as missing or instructs one or more other computing devices of the DSN to rebuild the flagged missing encoded data slices. Alternatively, the computing device may schedule rebuilding encoded data slices flagged as missing for later time. Further, the computing device may initiate storage of one or more foster slices for the flagged missing encoded data slices on an available storage unit of the set of storage units.

Another next level missing slice determination approach may include waiting a time period for the unavailable storage unit to become available. For example, when "n−k+x" encoded data slices of a set of encoded data slices are not potentially missing, the next level missing slice determination approach includes waiting a time period for the unavailable storage unit to become available and then sending a list source request to the unavailable storage unit. The time period is set based on one or more of: performance requirements, rebuild delay, and network bandwidth. This period of time may adapt automatically to tradeoff between unnecessary rebuild activity (rebuilding slices which still exist as foster slices on off-line storage units) and reduced reliability (caused by postponing rebuilds).

Another next level missing slice determination approach may include the computing device determining whether one or more received list source responses indicate storage of the potentially missing encoded data slices on one or more other storage units. When the one or more received list source responses do not indicate storage of the potentially missing encoded data slices on the one or more other storage units, the computing device waits a time period to receive the one or more list source responses indicating storage of the potentially missing encoded data slices on one or more other storage units. The time period is set based on one or more of: performance requirements, rebuild delay, and network bandwidth. When the one or more received list source responses indicate storage of the potentially missing encoded data slices on the one or more other storage units, the computing device identifies the potentially missing encoded data slices as not missing.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   determining, by a computing device of a dispersed storage network (DSN), a source name for a data object to be scanned for missing encoded data slices, wherein the data object is stored as a plurality of sets of encoded data slices on a set of storage units of the DSN;
   issuing, by the computing device, list source requests to the set of storage units; and
   when a list source response is not received from a storage unit of the set of storage units within a response timeframe:
      identifying, by the computing device, one or more encoded data slices stored on the storage unit as potentially missing encoded data slices;
      determining, by the computing device, a next level missing encoded data slice determination approach for the storage unit based on one or more of: a number of potentially missing encoded data slices, a performance goal, a network loading level, a rebuilding loading level, a predetermination, and an entry of a system registry; and
      executing, by the computing device, the next level missing encoded data slice determination approach.

2. The method of claim 1 further comprises:
   when one or more list source responses are received within the response timeframe:
      identifying, by the computing device, missing encoded data slices from the plurality of sets of encoded data slices based on the received list source responses.

3. The method of claim 1, wherein the list source requests include requests to list slice names of encoded data slices associated with the source name stored by the set of storage units.

4. The method of claim 1, wherein the next level missing slice determination approach includes:
   when "n−k+x" or less encoded data slices of a set of encoded data slices of the plurality of sets of encoded data slices are potentially missing, wherein "n" is a width number, "k" is a decode threshold number, and "x" is an integer between 1 and "n−k−1," wherein the width number is a total number of encoded data slices of the set of encoded data slices and the decode threshold number is a minimum number of encoded data slices of the set of encoded data slices required to recover a data segment of the data object, and wherein the data segment is dispersed storage error encoded to produce the set of encoded data slices:
      flagging, by the computing device, the potentially missing encoded data slices as missing encoded data slices.

5. The method of claim 4 further comprises one of:
   rebuilding, by the computing device, the flagged missing encoded data slices; and
   instructing, by the computing device, one or more other computing devices of the DSN to rebuild the flagged missing encoded data slices.

6. The method of claim 4 further comprises:
scheduling, by the computing device, rebuilding the flagged missing encoded data slices for a later time.

7. The method of claim 4 further comprises:
initiating, by the computing device, storage of one or more foster slices for the flagged missing encoded data slices on an available storage unit of the set of storage units.

8. The method of claim 1, wherein the next level missing slice determination approach includes:
when "n−k+x" or less encoded data slices of a set of encoded data slices of the plurality of sets of encoded data slices are not potentially missing, wherein "n" is a width number, "k" is a decode threshold number, and "x" is an integer between 1 and "n−k−1," wherein the width number is a total number of encoded data slices of the set of encoded data slices and the decode threshold number is a minimum number of encoded data slices of the set of encoded data slices required to recover a data segment of the data object, and wherein the data segment is dispersed storage error encoded to produce the set of encoded data slices:
waiting, by the computing device, a time period for the storage unit to become available, wherein the time period is set based on one or more of: performance requirements, rebuild delay, and network bandwidth; and
sending, by the computing device, a list source request to the storage unit.

9. The method of claim 1, wherein the next level missing slice determination approach includes:
determining, by the computing device, whether one or more received list source responses indicate storage of the potentially missing encoded data slices on one or more other storage units;
when the one or more received list source responses do not indicate storage of the potentially missing encoded data slices on the one or more other storage units:
waiting, by the computing device, a time period to receive one or more list source responses indicating storage of the potentially missing encoded data slices on one or more other storage units, wherein the time period is set based on one or more of: performance requirements, rebuild delay, and network bandwidth; and
when the one or more received list source responses indicate storage of the potentially missing encoded data slices on the one or more other storage units:
identifying, by the computing device, the potentially missing encoded data slices as not missing.

10. A computing device of a dispersed storage network (DSN), the computing device comprises:
an interface;
memory; and
a processing module operably coupled to the memory and the interface, wherein the processing module is operable to:
determine a source name for a data object to be scanned for missing encoded data slices, wherein the data object is stored as a plurality of sets of encoded data slices on a set of storage units of the DSN;
issue list source requests to the set of storage units; and
when a list source response is not received from a storage unit of the set of storage units within a response timeframe:
identify one or more encoded data slices stored on the storage unit as potentially missing encoded data slices;
determine a next level missing encoded data slice determination approach for the storage unit based on one or more of: a number of potentially missing encoded data slices, a performance goal, a network loading level, a rebuilding loading level, a predetermination, and an entry of a system registry; and
execute the next level missing encoded data slice determination approach.

11. The computing device of claim 10, wherein the processing module is further operable to:
when one or more list source responses are received within the response timeframe:
identify missing encoded data slices from the plurality of sets of encoded data slices based on the received list source responses.

12. The computing device of claim 10, wherein the list source requests include requests to list slice names of encoded data slices associated with the source name stored by the set of storage units.

13. The computing device of claim 10, wherein the next level missing slice determination approach includes:
when "n−k+x" encoded data slices of a set of encoded data slices of the plurality of sets of encoded data slices are potentially missing, wherein "n" is a width number, "k" is a decode threshold number, and "x" is an integer between 1 and "n−k−1," wherein the width number is a total number of encoded data slices of the set of encoded data slices and the decode threshold number is a minimum number of encoded data slices of the set of encoded data slices required to recover a data segment of the data object, and wherein the data segment is dispersed storage error encoded to produce the set of encoded data slices, the processing module is further operable to:
flag the potentially missing encoded data slices as missing encoded data slices.

14. The computing device of claim 13, wherein the processing module is further operable to:
rebuild the flagged missing encoded data slices; or
instruct one or more other computing devices of the DSN to rebuild the flagged missing encoded data slices.

15. The computing device of claim 13, wherein the processing module is further operable to:
schedule rebuilding the flagged missing encoded data slices for a later time.

16. The computing device of claim 13, wherein the processing module is further operable to:
initiate storage of one or more foster slices for the flagged missing encoded data slices on an available storage unit of the set of storage units.

17. The computing device of claim 10, wherein the next level missing slice determination approach includes:
when "n−k+x" encoded data slices of a set of encoded data slices of the plurality of sets of encoded data slices are not potentially missing, wherein "n" is a width number, "k" is a decode threshold number, and "x" is an integer between 1 and "n−k−1," wherein the width number is a total number of encoded data slices of the set of encoded data slices and the decode threshold number is a minimum number of encoded data slices of the set of encoded data slices required to recover a data segment of the data object, and wherein the data segment is dispersed storage error encoded to produce the set of encoded data slices, the processing module is further operable to:
- wait a time period for the storage unit to become available, wherein the time period is set based on one or more of: performance requirements, rebuild delay, and network bandwidth; and
- send a list source request to the storage unit.

18. The computing device of claim 10, wherein the next level missing slice determination approach includes:
- determining whether one or more received list source responses indicate storage of the potentially missing encoded data slices on one or more other storage units;
- when the one or more received list source responses do not indicate storage of the potentially missing encoded data slices on the one or more other storage units, the processing module is further operable to:
  - wait a time period to receive one or more list source responses indicating storage of the potentially missing encoded data slices on one or more other storage units, wherein the time period is set based on one or more of: performance requirements, rebuild delay, and network bandwidth; and
- when the one or more received list source responses indicate storage of the potentially missing encoded data slices on the one or more other storage units, the processing module is further operable to:
  - identify the potentially missing encoded data slices as not missing.

* * * * *